US010508459B2

(12) United States Patent
Sargent et al.

(10) Patent No.: US 10,508,459 B2
(45) Date of Patent: Dec. 17, 2019

(54) TIP-OVER POST (71) Applicant: ROOFTOP ANCHOR, INC., Heber City, UT (US)

(72) Inventors: Nathan Milton Sargent, Heber City, UT (US); Kynan Dee Wynne, Heber City, UT (US); Tyson Matheson Munford, Heber City, UT (US); Joshua Paul Adam, Heber City, UT (US); Braxton Tyler Schindler, Heber City, UT (US)

(73) Assignee: Rooftop Anchor, Inc., Heber City, UT (US)

( * ) Notice: Subject to any disclaimer, the term of this patent is extended or adjusted under 35 U.S.C. 154(b) by 36 days.

(21) Appl. No.: 15/512,401

(22) PCT Filed: Sep. 19, 2014

(86) PCT No.: PCT/US2014/056489
§ 371 (c)(1),
(2) Date: Mar. 17, 2017

(87) PCT Pub. No.: WO2016/043767
PCT Pub. Date: Mar. 24, 2016

(65) Prior Publication Data
US 2017/0247894 A1   Aug. 31, 2017

(51) Int. Cl.
*E04G 21/32* (2006.01)
*A62B 35/00* (2006.01)
(Continued)

(52) U.S. Cl.
CPC ........ *E04G 21/329* (2013.01); *A62B 35/0068* (2013.01); *A62B 35/04* (2013.01);
(Continued)

(58) Field of Classification Search
USPC ....... 248/519, 528, 529, 160, 159, 417, 507, 248/508, 509; 182/3
See application file for complete search history.

(56) References Cited

U.S. PATENT DOCUMENTS

| 1,939,968 A | * | 12/1933 | Frei, Jr. | .................. | E01F 9/627 |
| | | | | | 116/63 R |
| 7,207,414 B2 | * | 4/2007 | Luke | .................. | A62B 35/0056 |
| | | | | | 182/3 |

(Continued)

FOREIGN PATENT DOCUMENTS

| CN | 103147570 A | 6/2013 |
| JP | H08-028095 A | 1/1996 |
| WO | 2011070374 A1 | 6/2011 |

*Primary Examiner* — Alfred J Wujciak
(74) *Attorney, Agent, or Firm* — Lee & Hayes, P.C.

(57) ABSTRACT

A tip over post includes a stanchion. The stanchion includes an annular cylinder. The annular cylinder includes a number of cuts defined along the longitudinal axis of the cylinder. A stanchion includes an annular cylinder. The annular cylinder includes a number of helical cuts defined along the longitudinal axis of the cylinder. The helical cuts comprise a number of perforations located along the helical cuts. The load the stanchion is to bear is based at least in part on the number of perforations located along the helical cuts. A method of arresting a fall includes installing a tip over post, and arresting a fall using the moment and linear expansion of the annular cylinder. The tip over post includes an annular cylinder including a number of helical cuts defined along the longitudinal axis of the cylinder. The helical cuts comprise a number of perforations located along the helical cuts.

18 Claims, 10 Drawing Sheets (51) Int. Cl.
*A62B 35/04* (2006.01)
*F16M 13/02* (2006.01)

(52) U.S. Cl.
CPC ......... *E04G 21/3204* (2013.01); *F16M 13/02* (2013.01); *E04G 21/328* (2013.01)

(56) References Cited

U.S. PATENT DOCUMENTS

| | | | | |
|---|---|---|---|---|
| 7,393,214 | B2 * | 7/2008 | DiStefano | H01R 13/2407 |
| | | | | 439/66 |
| 8,511,628 | B2 * | 8/2013 | Cox | A62B 1/04 |
| | | | | 248/237 |
| 9,431,809 | B2 * | 8/2016 | Vogel | A62B 35/0068 |
| 2008/0277557 | A1 | 11/2008 | Vetesnik et al. | |
| 2010/0187040 | A1 * | 7/2010 | Siemienowicz | A62B 1/04 |
| | | | | 182/3 |
| 2012/0001051 | A1 * | 1/2012 | Williams | A47G 29/1216 |
| | | | | 248/519 |
| 2012/0073900 | A1 | 3/2012 | Cruz | |

* cited by examiner

TIP-OVER POST

BACKGROUND

Fall protection devices are devices that assist in protecting users from falling off structures such as buildings. These fall protection devices seek to prevent a fall from structures by securing the user to anchors coupled to the structure such as the roof. Fall arrest devices are devices that protect users from experiencing forces on their bodies that may result in serious bodily injury or death. The fall arrest devices seek to minimize the forces of gravity by reducing the severity and duration of an impact force experienced during a fall event. These devices are often regulated by the Occupational Safety and Health Administration (OSHA) that function under a number of laws and regulations such as Title 29 of the Code of Federal Regulations. Further, industries standards may be provided by private, non-profit organizations such as the American National Standards Institute (ANSI). For example, guidance and testing parameters for fall protection and fall arrest devices are provided by the ANSI Z-359 Fall Protection Code.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Often, individuals are tasked with servicing utilities on roofs of buildings, installing or maintaining heating, ventilation, and air conditioning (HVAC) systems, installing or maintaining security systems, washing windows on the building, or installing or fixing signage on the building, among other tasks that involve accessing areas of the building from which the individual could fall. These individuals are subjected to strict requirements under, for example, the Occupational Safety and Health Administration (OSHA) where they must be tied to the building to eliminate or reduce injuries from falls from the roof or side of the building. These individuals may be tethered to a tip-over post or other deformable anchorage systems that reduces momentum or slows and/or arrests their descent after a fall.

As described above, fall protection devices and fall arrest devices are devices that seek to prevent a fall from structures, minimize the forces of gravity by slowing and eventually arresting a fall, catching a user in a fall before he or she hits the ground, and doing so in a manner which does not subject the user to unsafe levels of force or impact. The present systems and devices provide for a tip over post with a stanchion that comprises an annular cylinder. The annular cylinder comprises a number of cuts defined along the longitudinal axis of the cylinder. The cuts in the annular cylinder may be defined along the longitudinal axis of the annular cylinder to form a number of holes through the wall of the annular cylinder, a number of scorings, a number of perforations, or combinations thereof. In one example, the cuts are formed as helical cuts comprising a number of cuts defined within the annular cylinder in a helical manner relative to one another. The description herein presents an example in which a number of helical cuts are defined within the annular cylinder. However, these helical cuts are examples only. Any number of different types, shapes, locations, layouts, positions, and patterns of cuts may be defined within the annular cylinder (101).

The size and/or strength of the lands between the perforations may vary along the length of the annular cylinder providing a point in along the cuts of the cylinder at which the tip over post will bend or tip over at its moment. This may occur when a force such as the loading experienced during a fall arrest is applied to the tip over post. Thereafter, the cuts separate from each other or "unzip" such that the force needed to separate the cuts from each other acts in opposition to the forces experienced by the mass of the individual falling due to gravitational force. This unzipping slows and arrests the individual's fall, saving the individual from a sudden stop during the fall that would exert stresses on the individual's body causing serious injury or death. Thus, apart from saving the individual from hitting the ground, the present tip-over post system eliminates or reduces the possibility of an individual experiencing catastrophic forces on his or her body. The tip-over post system, once deployed, remains attached to the structure, and prevents the individual from falling any further from their original height after arresting the fall.

As used in the present specification and in the appended claims, the term "cut" or similar language is meant to be understood broadly as any level of ablation or separation of material. In one example, the term "cut" may comprise a complete separation of a portion of material from the remainder such that a hole is created through a wall of the material. In another example, the term "cut" may comprise a separation of a portion of material from the remainder such that a hole is not created entirely through the wall of the material, but a scoring is created. In this example, the cutting reduces the thickness of a material along a line to weaken it intentionally along that line. In still another example, the term "cut" may comprise perforations along a line where portions of a material along that line are completely separated from the remainder of a the material such that a hole is created through a wall of the material while other portions of the material along that line are left uncut or scored.

As will be described in more detail below, the cuts are defined within an annular cylinder. The cuts may be defined in the annular cylinder in any pattern. In one example, the cuts are defined in the annular cylinder in a parallel fashion such that the number of cuts are equidistant from each other at all points along the cuts irrespective of the direction of travel of the cuts or change of direction of the cuts. In this example, any number of patterns may be created by the cuts defined within the annular cylinder including, for example, helical cuts, wave cuts, or saw tooth cuts, among many other cuts, or combinations thereof.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
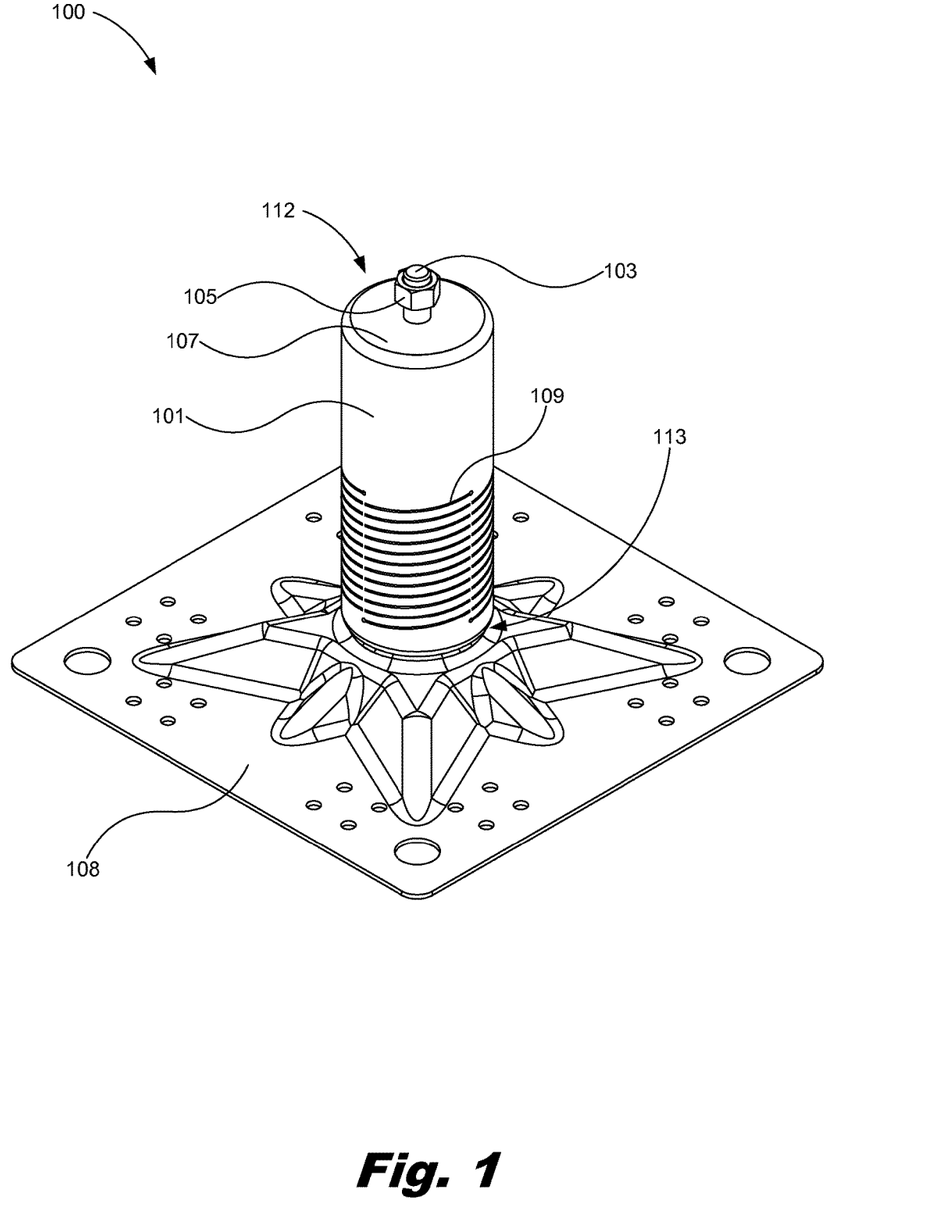
FIG. 1 is a perspective view of a tip-over post system, according to one example of the principles described herein.

Turning now to the figures, FIG. 1 is a perspective view of a tip-over post system (100), according to one example of the principles described herein. The tip-over post system (100) comprises an annular cylinder (101), and a base plate (108) coupled to the annular cylinder (101). The annular cylinder (101) comprises a top cap (107), a first bolt (103) screwed into a first threaded bolt head (FIG. 2, 210) of the top cap (107), and a first nut (105) secured to the first bolt (103). In one example, the top cap (107) is welded to the annular cylinder (101), and the first bolt (103) is threaded into the first threaded bolt head (FIG. 2, 210) coupled to or defined within the top cap (107).

Figure 8:
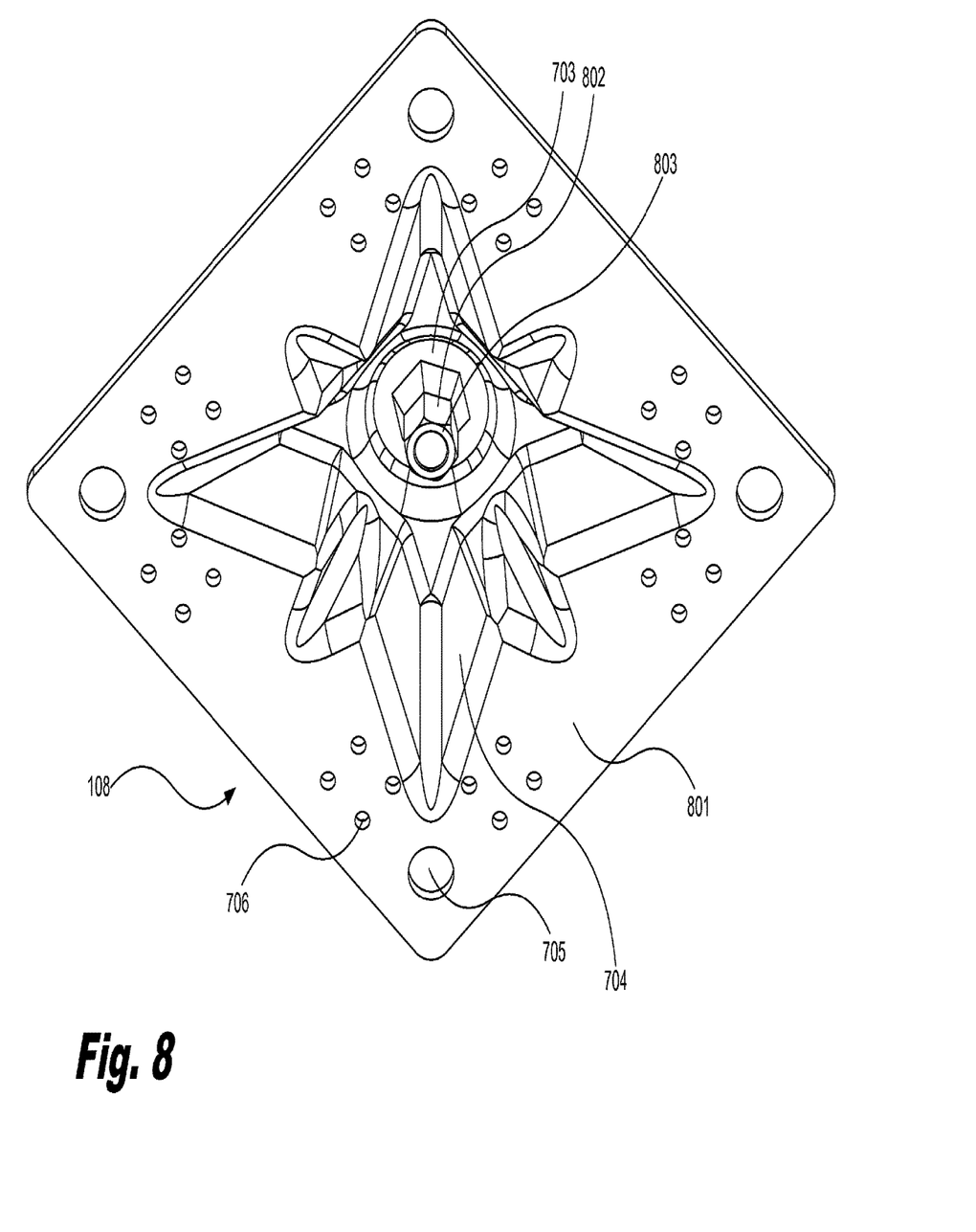
FIG. 8 is a perspective, bottom view of a base plate of the tip-over post system of FIG. 1, according to one example of the principles described herein.

The second end (113) of the annular cylinder (101) is coupled to a base plate (108), and the base plate is secured to a portion of the structure. In one example, the annular cylinder (101) may be secured to the base plate (108) via a bottom cap (FIG. 5B, 110) welded to the annular cylinder (101), a second bolt (104) is coupled to the bottom cap (FIG. 5B, 110), and a second nut (FIG. 8, 803) welded to a recess (FIG. 8, 802) defined in the underside (801) of the base plate (108). In another example, the annular cylinder (101) may be directly welded to the base plate (108), eliminating the need for the bottom cap (110), the second bolt (104), and second nut (FIG. 8, 803). In still another example, the annular cylinder (101) and base plate (108) may be milled or forged as a complete unit.

In one example, the base plate (108) may be coupled to a structural element of a building. As used in the present specification and in the appended claims, the term "structural" or similar language is meant to be understood broadly as any element within a structure that is capable of supporting loads. Structural elements of a structure comprise, for example, beams, joists, rafters; bearing walls, and bracing elements, among other elements. In one example, structural elements are not ornamental elements such as roofing, decking, facades, or facie.

In another example, the base plate (108) may be coupled to a non-structural portion of the structure. Non-structural portions of a structure may comprise, for example, metal decking, plywood decking, composite decking, standing seam metal panels, or trapezoidal profile roofs, among other structural components. The tip-over post system (100) provides for a reduction or elimination of force applied to the structure during a fall arrest event. Due to the reduction or elimination of force applied to the structure during a fall arrest event, and due to the energy absorption qualities of the tip-over post system (100), the tip-over post system (100) may be coupled to non-structural elements of the structure in addition to structural elements without damaging the structure and while still providing fall arrest capabilities. This advantage allows the tip-over post system (100) to be more easily installed, reduces or alleviates the need of additional support built into the structure such as bracing, and allows for the tip-over post system (100) to be installed in a larger number of locations on the structure. This, in turn reduces installation costs and costs in materials. The method of securing the annular cylinder (101) to the base plate (108) will be described in more detail below.

The annular cylinder (101) of the tip-over post system (100) comprises a number of cuts (109) defined within the wall of the annular cylinder (101). Any pattern and any number of cuts may be defined within the annular cylinder (101). In the example of FIG. 1, the defined cuts are helical relative to one another.

As depicted in the example of FIG. 1 and throughout the remainder of the figures, four helical cuts generally designated as 109 are defined within the wall of the annular cylinder (101). However, any number of helical cuts (109) may be defined according to an application of the tip-over post system (100). For example, the number of helical cuts (109) defined within the wall of the annular cylinder (101) may depend on the mass the tip-over post system (100) is intended to arrest from a free fall, a desired moment, a desired shear stress level, desired level of torque threshold, desired level of moment forces, statutory requirements, regulatory requirements, other factors, or combinations thereof.

As indicated above, the helical cuts (109) in the annular cylinder (101) may be defined along the longitudinal axis of the annular cylinder (101) so as to form a number of holes through the annular cylinder (101). In this manner, a void is defined through the entire thickness of the wall of the annular cylinder (101). In another example, the helical cuts (109) in the annular cylinder (101) may be defined along the longitudinal axis of the annular cylinder (101) so as to form a number of scorings through the cylinder. In this example, the scoring is an indentation built into the annual cylinder (101) for the purpose of allowing the helical cuts (109) to separate from each other once a force is applied.

In still another example, the helical cuts (109) in the annular cylinder (101) may be defined along the longitudinal axis of the annular cylinder (101) so as to form a number of perforations through the annular cylinder (101). The perforations are depicted throughout the figures, and will be described in more detail below. In one example, the size, width and/or strength of the lands between perforations may vary along the length of the helical cuts (109) defined in the annular cylinder (101).

The helical cuts (109) may be defined or formed in the wall of the annular cylinder (101) using any form of material removal or material formation techniques. For example, the helical cuts (109) may be laser cut, acid etched, cut with a water jet cutter, sawed, sheared, chiseled, or milled, among other material removal techniques. In another example, the helical cuts (109) may be formed at the time the annular cylinder is formed such as in a mold.

Once separated at the holes, scorings, and/or perforations, the helical cuts (109) deform from their original positions within the annular cylinder (101), and extend along the longitudinal axis of the annual cylinder (101). Thus, when deployed, the annular cylinder (101) may first "tip over" by breaking at a given point along the helical cuts (109) at the bending moment; a measure of the average internal stress induced in a structural element when an external force or moment is applied to the element causing the element to bend. Thus, when a load is applied perpendicular to the upright tip-over post system (100) and parallel with the surface to which the tip-over post system (100) is attached is applied to the annular cylinder (101), the annular cylinder (101) bends at the bending moment. The force exerted here may be the force experienced on the tip-over post system (100) when a user, who is tethered to the tip-over post system (100), falls from the structure to which the tip-over post system (100) is coupled.

Once bent, the annular cylinder (101) begins to extend or elongate due to the "unzipping" or separation of helical cuts (109) from each other, and deform from the shape of the annular cylinder (101). This may occur when, during the fall arrest, the force experienced therefrom continues after the commencement of the force during the first phase. Thereafter, the helical cuts (109) arrest the fall of the user by ensuring that the force needed to separate the helical cuts from each other acts in opposition to the forces experienced by the mass of the user falling due to the gravitational force. This unzipping slows and arrests the user's fall, saving the user from hitting the ground due to the user being tethered to the structure via the tip-over post system (100). This also saves the user from experiencing too sudden of a stop that may cause injury or death to the user through the absorption of energy provided by the unzipping. This further minimizes force and potentially resulting damage to the structure to which the tip-over post system (100) attached. Further, the unzipping eliminates or reduces potential failure of the system at the point where the tip-over post system (100) attached to the structure. More details regarding the annular cylinder (101) and the helical cuts (109), and how these elements interact with the other elements of the tip-over post system (100) will now be described in more detail in connection with FIGS. 2 through 6.

Figure 2:
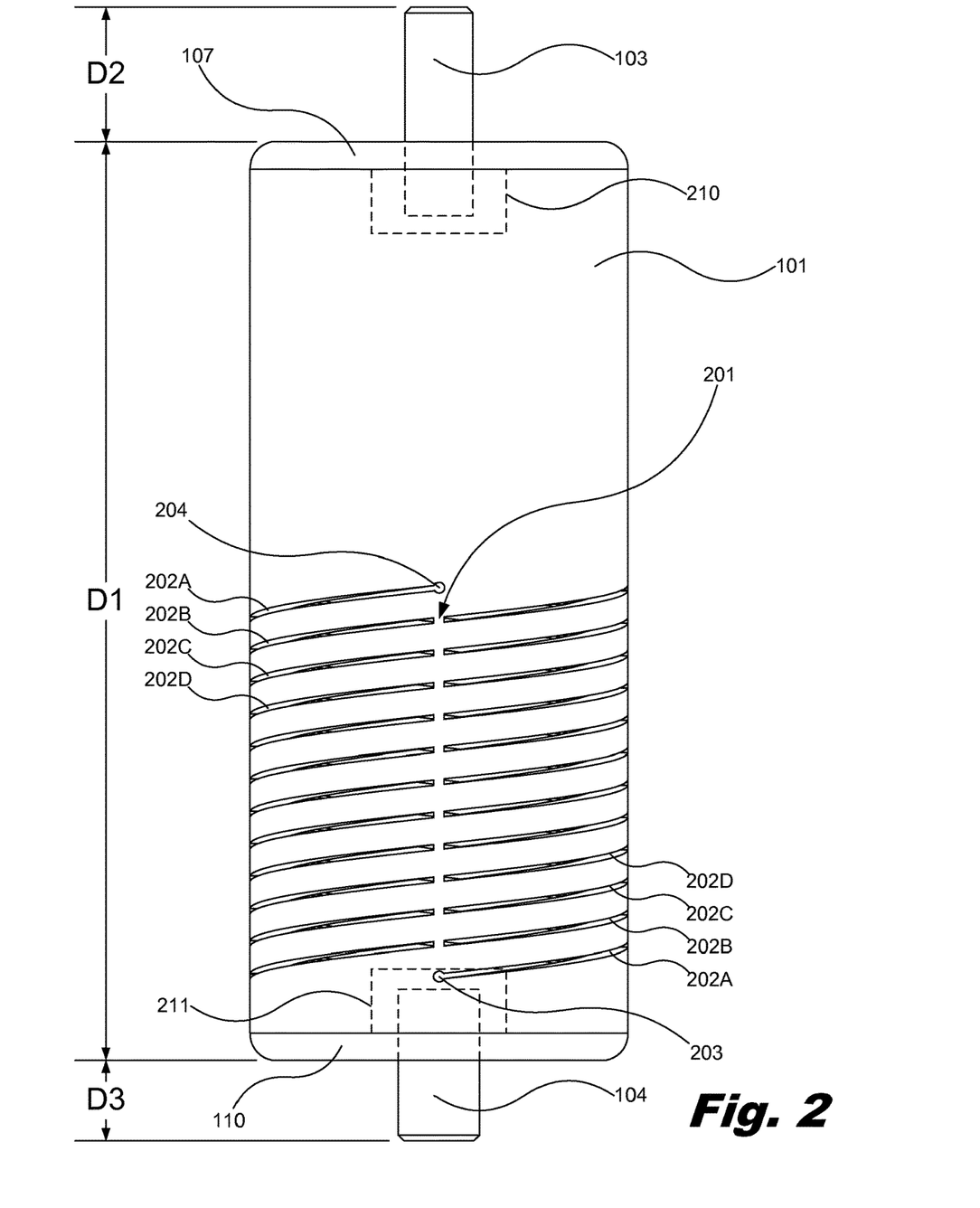
FIG. 2 is a side view of an annular cylinder of the tip-over post system of FIG. 1, according to one example of the principles described herein.

FIG. 2 is a side view of the annular cylinder (101) of the tip-over post system (100) of FIG. 1, according to one example of the principles described herein. The annular cylinder (101) is made from a material that, when subjected to a force, experiences a large plastic deformation range with respect to, for example, plastics, rubber, crystals, and ceramics which experience a relatively shorter plastic deformation range. In one example, the material is malleable and ductile. In another example, the material is a metal or metal alloy. In still another example, the material is a carbon steel. In yet another example, the material is a mild or low carbon steel. In yet another example, the material is a steel with between approximately 0.05% to 2.5% carbon. In yet another example, the material is a steel with between approximately 0.05% to 0.320% carbon.

Figure 5A:
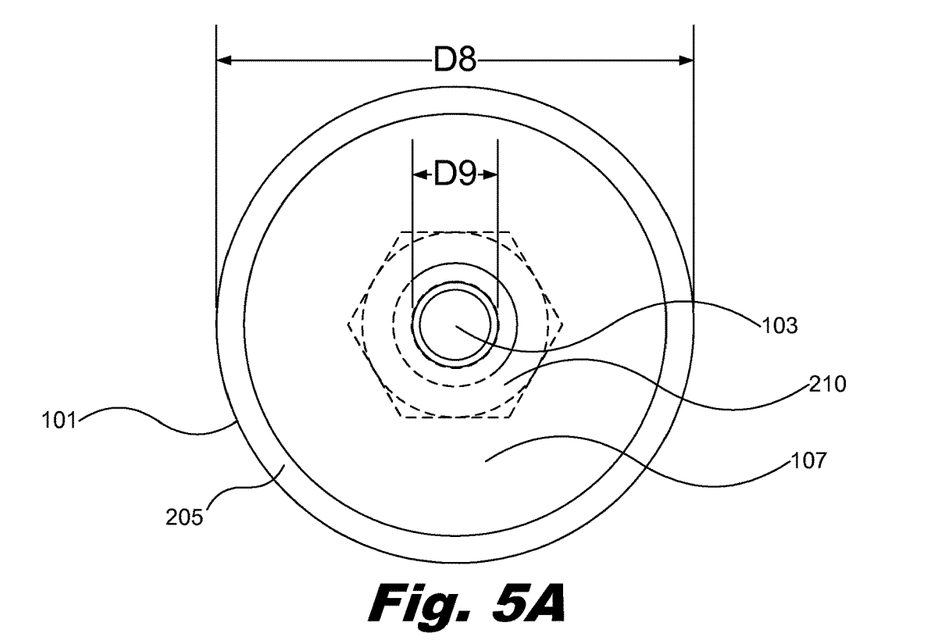
FIG. 5A is a top view of the annular cylinder of FIG. 2, according to one example of the principles described herein.
Figure 5B:
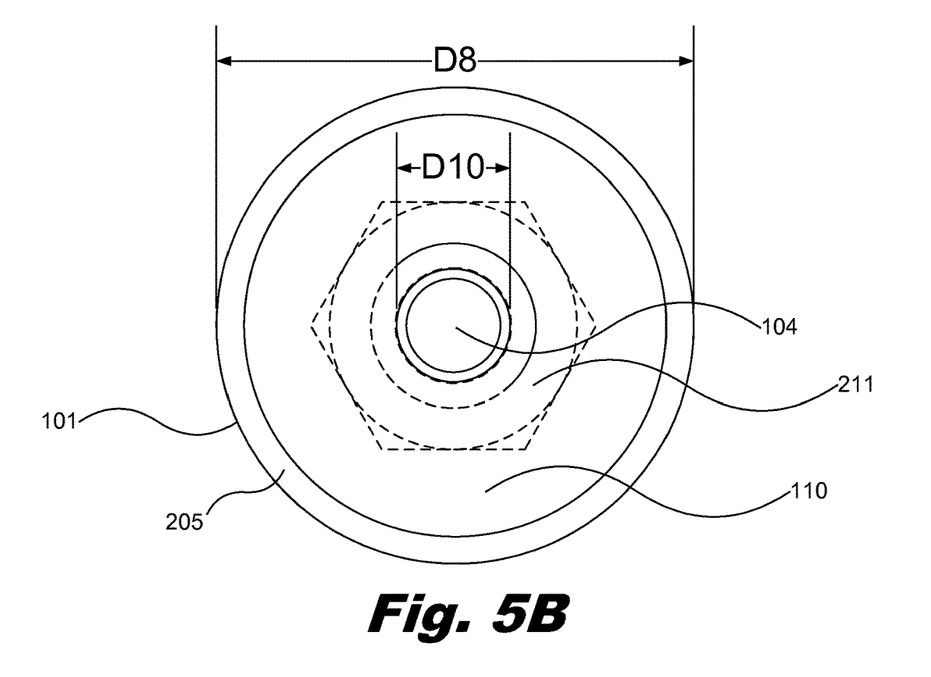
FIG. 5B is a bottom view of the annular cylinder of FIG. 2, according to one example of the principles described herein.

As depicted in FIG. 2, the annular cylinder (101) comprises a top cap (FIGS. 2 and 5A, 107) and a bottom cap (FIG. 5B, 110). The top cap (107) and bottom cap (110) are coupled to the annular cylinder (101). In one example, the top cap (107) and bottom cap (110) may be coupled to the annular cylinder (101) through welding, bolting, other coupling method, or formed from a single piece of material along with the annular cylinder (101). The annular cylinder (101) comprises a height as designated by D1. In one example, D1 may be approximately 8.5 inches. However, the height (D1) of the annular cylinder (101) may be any length suitable for a given application.

The first bolt (103) is coupled to the top cap (FIGS. 2 and 5A, 107). In one example, the first bolt (103) is coupled to the top cap (107) via a first threaded bolt head (210) coupled to the top cap (107). In another example, the first bolt (103) is coupled to the top cap (107) through welding. The first bolt may extend a distance (D2) above the annular cylinder (101). In one example, D2 may be approximately 1.25 inches.

A second bolt (104) is coupled to the bottom cap (FIG. 5B, 110). In one example, the second bolt (104) is coupled to the bottom cap (FIG. 5B, 110) via a second threaded bolt head (211) coupled to the bottom cap (110). In another example, the second bolt (104) is coupled to the bottom cap (110) through welding. The second bolt may extend a distance (D3) below the annular cylinder (101). In one example, D3 may be approximately 0.75 inches.

As depicted in FIG. 2, the annular cylinder (101) comprises a number of helical cuts (109, 202A, 202B, 202C, 202D) defined within the wall thereof. The helical cuts are generally referred to hereafter as 202. In the example of FIG. 2, four intertwined helical cuts (202A, 202B, 202C, 202D) are depicted. However, any number of helical cuts (202) may be defined in the wall of the annular cylinder (101). In one example, the helical cuts (202) may comprise a first end (203) and a second end (204). Further, the helical cuts (202) may be defined for a number of revolutions around the circumference of the annular cylinder (101). In the example depicted in the figures, each helical cut (202A, 202B, 202C, 202D) is defined in the annular cylinder (101) for 3 revolutions.

The annular cylinder (101) may further comprise a number of lands (201). In one example, the lands (201) serve as the material between perforations as described above. A land (201) may bridge two helical cuts (202), and may be located at any point along the length of two neighboring helical cuts (202). In the example depicted in FIG. 2, the lands (201) are aligned with respect to each other. However, the lands (201) may be staggered among the helical cuts (202). More details regarding the lands (201) will be described in more detail below.

Figure 3:
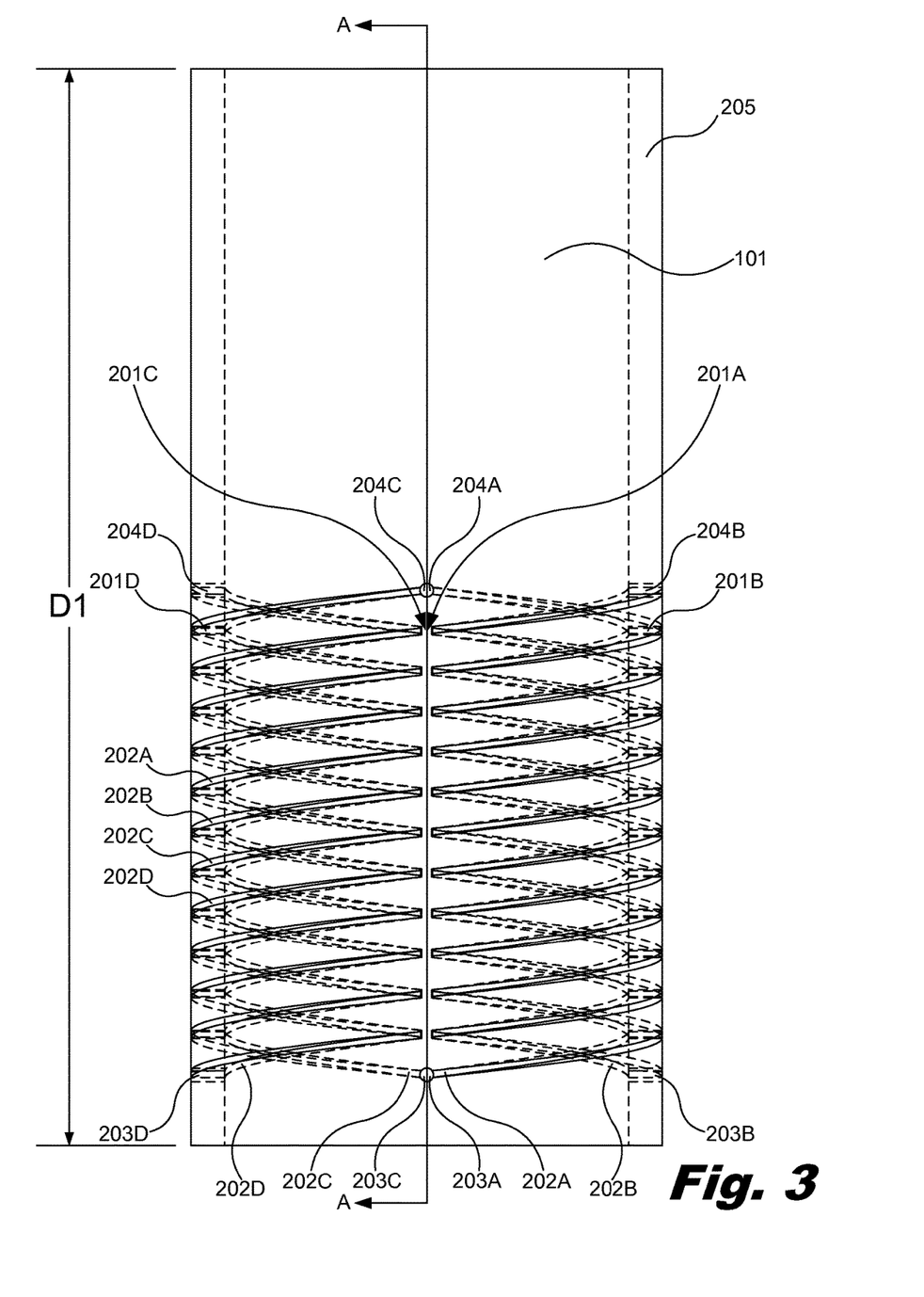
FIG. 3 is a side view of the annular cylinder of FIG. 2 depicting a number of helical cuts along the longitudinal axis of the annular cylinder, according to one example of the principles described herein.

FIG. 3 is a side view of the annular cylinder (101) of FIG. 2 depicting a number of helical cuts (202) along the longitudinal axis of the annular cylinder (101), according to one example of the principles described herein. As depicted in FIG. 3, the helical cuts (202) are made through the wall (205) of the annular cylinder (101). However, as described above, the helical cuts (202) may comprise a scoring where the helical cuts (202) do not completely extend through the wall (205).

The four helical cuts (202A, 202B, 202C, 202D) are depicted using both solid and dotted lines to indicate that the helical cuts (202) wrap around to the back side of the annular cylinder (101) as depicted in FIG. 3. Although four helical cuts (202A, 202B, 202C, 202D) are depicted throughout the figures herein, any number of cuts may be defined within the annular cylinder (101). The number of cuts defined in the annular cylinder (101) may be based on an expected or engineered load applied to the tip-over post system (100).

In one example, the helical cuts (202) have first ends (203A, 203B, 203C, 203D) that are located at 90 degree intervals relative to the circumference of the annular cylinder (101). In FIG. 3, first end 203A and first end 203C are depicted in the same place, but located on opposite sides of the annular cylinder (101) as can be discerned by the helical cut (202C) and its first end (203c) is depicted using dashed lines to indicate that it is behind the front surface of the annular cylinder (101). Similarly, the first end (203B) of helical cut (202B) and first end (203D) of helical cut (202D) are located on opposite sides of the annular cylinder (101).

Each individual helical cut (202A, 202B, 202C, 202D) begins at its respective first end (203A, 203B, 203C, 203D), and travels quadrahelically along the longitudinal axis of the annular cylinder (101) terminating at its respective second end (204A, 204B, 204C, 204D). As depicted in FIG. 3, the helical cuts (202) comprise a number of lands (201A, 201B, 201C, 201D) collectively referred to as 201. As described above, the lands (201) may bridge two helical cuts (202), and may be located at any point along the length of two neighboring helical cuts (202). In the example depicted in FIG. 3, the lands (201) are aligned with respect to each other with groupings of lands being located at 90 degree intervals relative to the circumference of the annular cylinder (101). However, in another example, the lands (201) may be staggered among the helical cuts (202).

In the example of FIG. 3, lands (201A) are located in a line along the longitudinal axis of the annular cylinder (101) between the first end (203A) and a second end (204A) of a first helical cut (202A). This formation of lands (201) is similarly depicted in FIGS. 1, 2, and 4. Similarly, lands (201B) are located in a line along the longitudinal axis of the annular cylinder (101) between the first end (203B) and a second end (204B) of a first helical cut (202B), lands (201C) are located in a line along the longitudinal axis of the annular cylinder (101) between the first end (203C) and a second end (204C) of a first helical cut (202C), and, lands (201D) are located in a line along the longitudinal axis of the annular cylinder (101) between the first end (203D) and a second end (204D) of a first helical cut (202D).

In one example, the size and/or strength of the lands (201) between perforations may vary along the length of the helical cuts (202) defined in the annular cylinder (101). For example, the lands (201) located throughout the length of the helical cuts (202) may comprise relatively smaller and/or weaker lands (201) in the middle of the length of the helical cuts (202) relative to the lands (201) located toward the first (203) and second (204) ends of the helical cuts (202). In this example, the relatively weaker lands (201) may cause the annular cylinder (101) of the tip-over post system (100) to tip over at the point at which the relatively weaker lands (201) along the length of the helical cuts (202).

In another example, the size and/or strength of the lands (201) between perforations may vary along the length of the helical cuts (202) defined in the annular cylinder (101) such that a gradient of size and/or strengths of the lands (201) is created along the length of the helical cuts (202). In this example, the gradient provides an increasing resistance to deformation within the helical cuts (202) as the tip-over post system (100) slows and arrests the momentum realized from the free fall of an individual tethered to the tip-over post system (100). Even more detail may be described in connection with FIG. 4.

Figure 4:
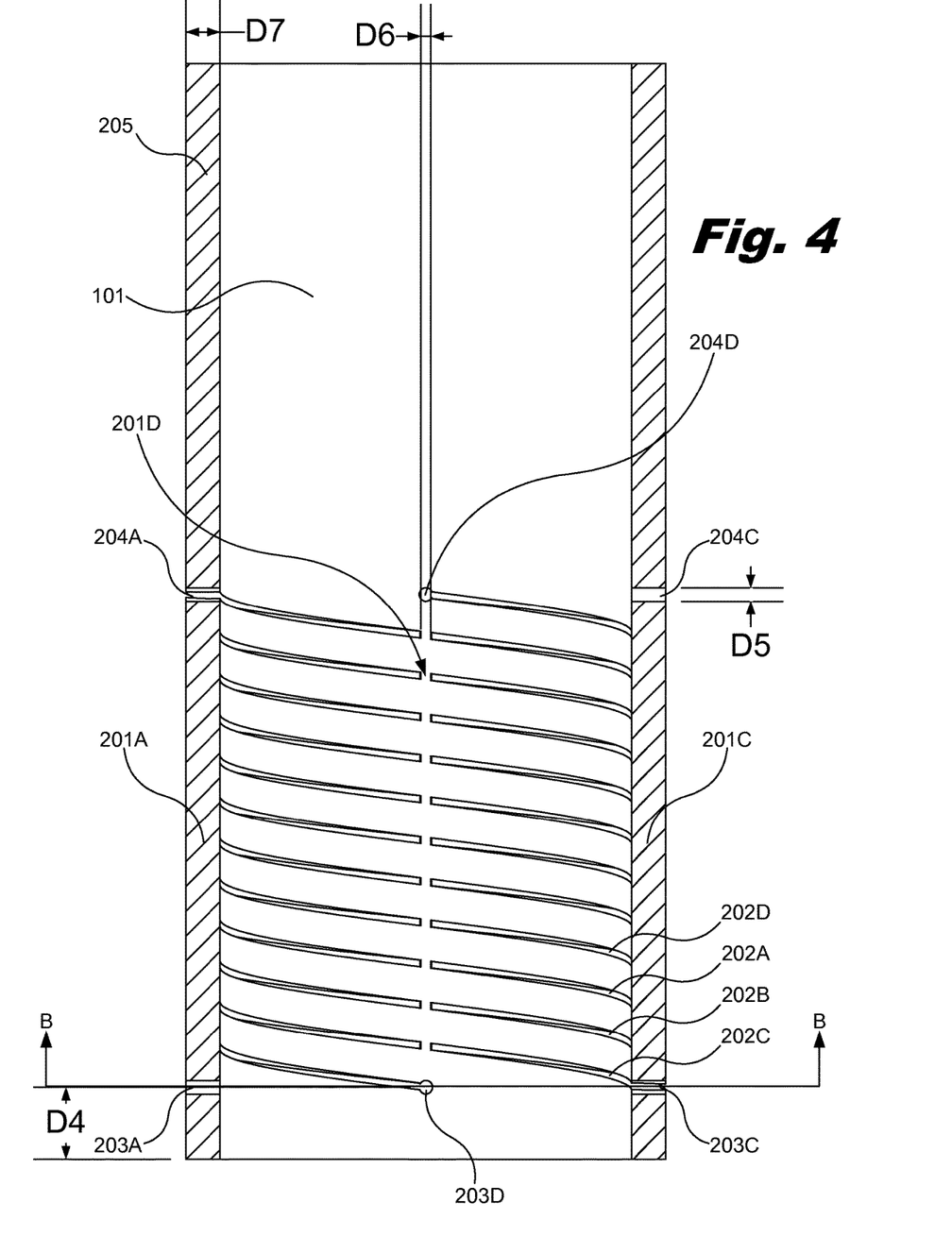
FIG. 4 is a cross-sectional cutaway view along line "A" of the annular cylinder of FIG. 3, according to one example of the principles described herein.

FIG. 4 is a cross-sectional cutaway view along line "A" of the annular cylinder (101) of FIG. 3, according to one example of the principles described herein. As depicted in FIG. 4, the helical cuts (202) comprise a number of lands (201). In the cross-sectional view depicted in FIG. 4, lands 201A, 201D, and 201C are depicted, and lands 201B would be included in the other half of the cross-sectional view. Distances D4, D5, D6, and D7 are also depicted in FIG. 4. D4 defines the distance from the bottom of the annular cylinder (101) to the middle of the first end (203) of the helical cuts (202). First ends 203A, 203D, and 203C are depicted in FIG. 4. In one example, D4 is between 0.1 and 1.0 inches. In another example, D4 is 0.5 inches.

D5 represents the height of the helical cuts, or, in other words, the cut size of the helical cuts (202). In one example, D5 is between 0.05 and 0.15 inches. In another example, D5 is 0.1 inches. D6 defines the gap between helical cuts (202) forming the lands (201), or, in other words, the size of the lands (201). In one example, D6 is between 0.01 and 0.1 inches. In another example, D6 is 0.09 inches. D7 is the thickness of the wall (205) of the annular cylinder (101). In one example, D7 is between 0.125 and 1.0 inches. In another example, D7 is 0.25 inches. In still another example, D7 is 0.5 inches. The lengths of D4, D5, D6, and D7 may be any length. In one example, the lengths of D4, D5, D6, and D7 are longer to accommodate for a particular installation location, desired or engineered load of the tip-over post system (100), or combinations thereof, among other parameters.

FIG. 5A is a top view of the annular cylinder (101) of FIG. 2, according to one example of the principles described herein. FIG. 5B is a bottom view of the annular cylinder (101) of FIG. 2, according to one example of the principles described herein. D8 defines the diameter of the annular cylinder (101). In one example, D8 is between 3.0 and 4.0 inches. In another example, D8 is 3.5 inches.

As depicted in FIGS. 5A and 5B, the annular cylinder (101) comprises a top cap (107) and a bottom cap (110). The top cap (107) and bottom cap (110) may be welded to the annular cylinder (101). The first threaded bolt head (210) and the second threaded bolt head (211) are coupled to the top cap (107) and bottom cap (110), respectively. In one example, the first threaded bolt head (210) and the second threaded bolt head (211) may be welded to the interior side of the top cap (107) and bottom cap (110), respectively. The first bolt (103) and second bolt (104) may have different diameters. D9 defines the diameter of the first bolt (103). In one example, D9 is between 0.5 and 0.7 inches. In another example, D9 is 0.625. D10 is the diameter of the second bolt (104). In one example, D10 is between 0.5 and 1 inches. In another example, D10 is 0.75 inches.

Figure 6:
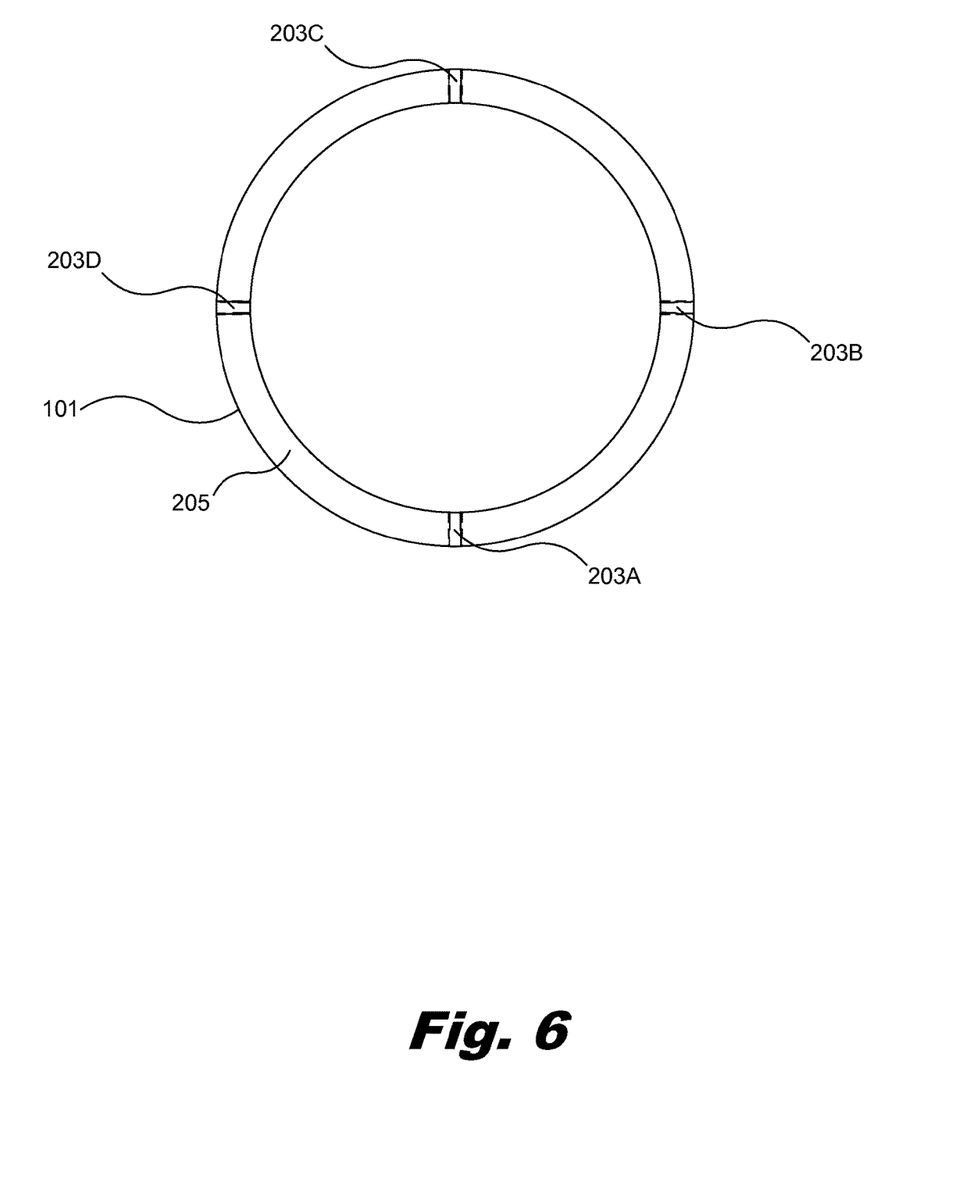
FIG. 6 is a cross-sectional cutaway view along line "B" of the annular cylinder of FIG. 4, according to one example of the principles described herein.

FIG. 6 is a cross-sectional cutaway view along line "B" of the annular cylinder (101) of FIG. 4, according to one example of the principles described herein. As depicted in FIG. 6, the first ends (203A, 203B, 203C, 203D) of their respective helical cuts (202A, 202B, 202C, 202D) are depicted as being formed as a hole through the wall (205) of the annual cylinder (101).

Figure 7:
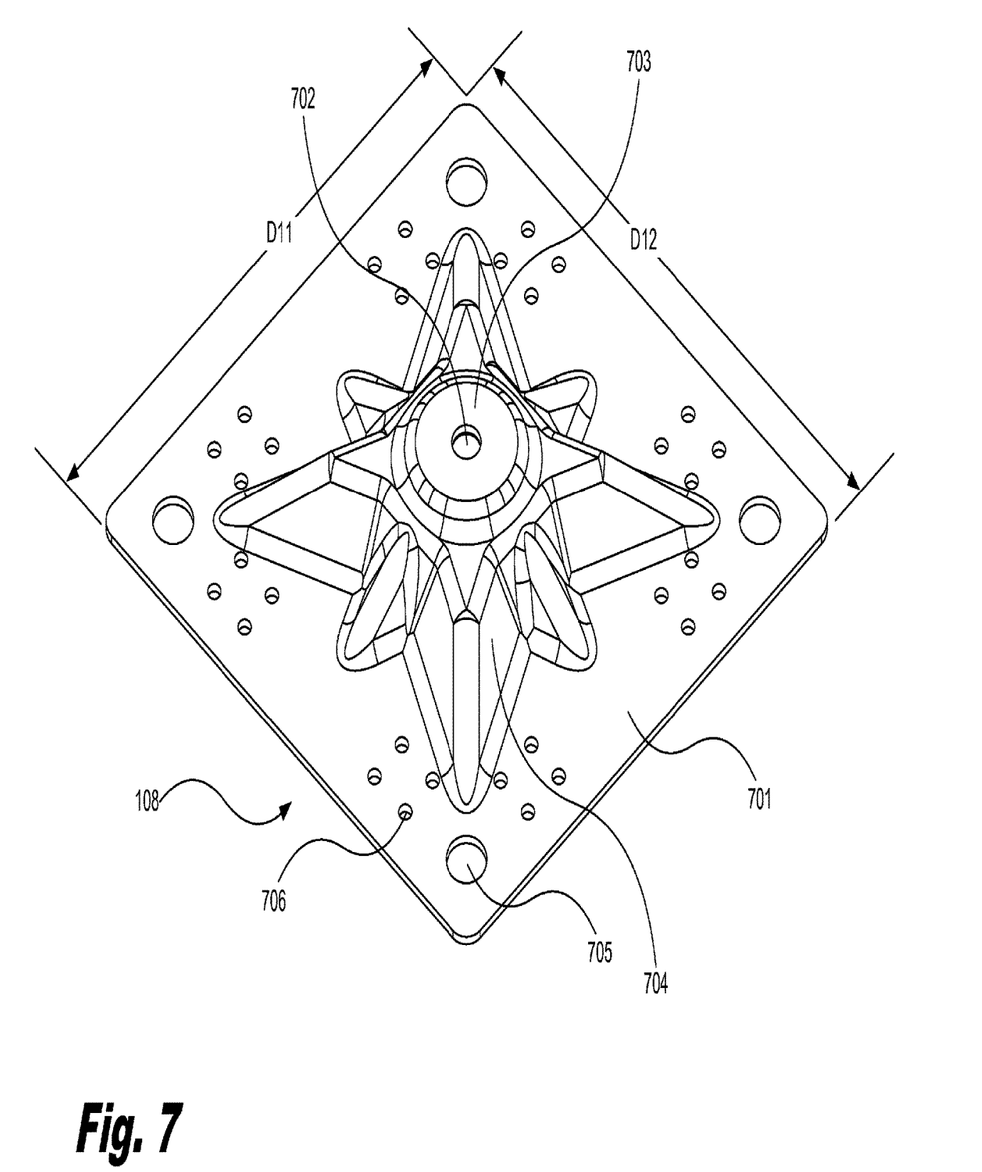
FIG. 7 is a perspective, top view of a base plate of the tip-over post system of FIG. 1, according to one example of the principles described herein.

FIG. 7 is a perspective, top view of a base plate (108) of the tip-over post system (100) of FIG. 1, according to one example of the principles described herein. The base plate (108) FIG. 8 is a perspective, bottom view of a base plate (108) of the tip-over post system (100) of FIG. 1, according to one example of the principles described herein. The base plate comprises a length (D11) and a width (D12). In one example, the length (D11) and the width (D12) are equal. In another example, the length (D11) and the width (D12) equal between 13 and 14 inches. In still another example, the length (D11) and the width (D12) equal 13.5 inches. In yet another example, the length (D11) and the width (D12) are not equal. The base plate (108) may be made of, for example, 11 gauge steel.

The base plate (108) may comprise a top orifice (702) defined in a base plate top cap (703) located on a top side (701) of the base plate (108) through which the second bolt (104) is inserted. Once inserted, the second bolt (104) is coupled to the mounting plate (108) via a second nut (803) coupled to a recess (802) defined in the underside (801) of the base plate (108). In one example, the second nut (803) is welded to the recess (802) of the base plate (108).

A number of deformations (704) may be formed in the base plate (108) creating a die pressed profile that strengthens the base plate (108) before and during application of the functions of the tip-over post system (100) caused by a fall arrest event. The deformations (704) are plastic deformations formed by, for example, die pressing, stamping, or through the use of a rolling die to put relief patterns in the base plate (108). The deformations (704) increase the bending strength of the base plate (108) in the directions perpendicular to the deformations (704). In the example of FIGS. 7 and 8, the deformations (704) extend radially outwards towards the edges of the base plate (108). In this manner, the strength and rigidity of the base plate (108) is increased in several directions. Thus, if the tip-over post system (100) is deployed during a fall arrest event, and the force applied to the tip-over post system (100) is in any direction 360 degrees around the tip-over post system (100), at least one deformation (704) will provide increased rigidity and strength to the base plate (108) such that the base plate (108) will not shear from the structure to which it is coupled. The deformations (704) may further cause water from rain or other sources to shed away from the annular cylinder (101) and other elements of the tip-over post system (100).

The base plate (108) may comprise a number of mounting apertures (705) for mounting the base plate (108) to a structure. The mounting apertures (705) may be defined in the base plate (108) to accommodate for a number of fasteners to couple the base plate (108) to the structure.

A number of secondary apertures (706) may be defined within the base plate (108) to provide additional strength to the base plate (108) and to allow additional methods of securing the base plate (108) to a structure. In one example, the secondary apertures (706) are formed using a punching processes. For example, a dimple dye or a flange dye may be used such that the dye creates additional flanges in the base plate (108) to further increase the strength and rigidity thereof. In providing additional methods of securing the base plate (108) to the structure, a number of screws nails, rivets, toggles, or other types of fasteners may be used to couple the base plate (108) to the structure.

Figure 9:
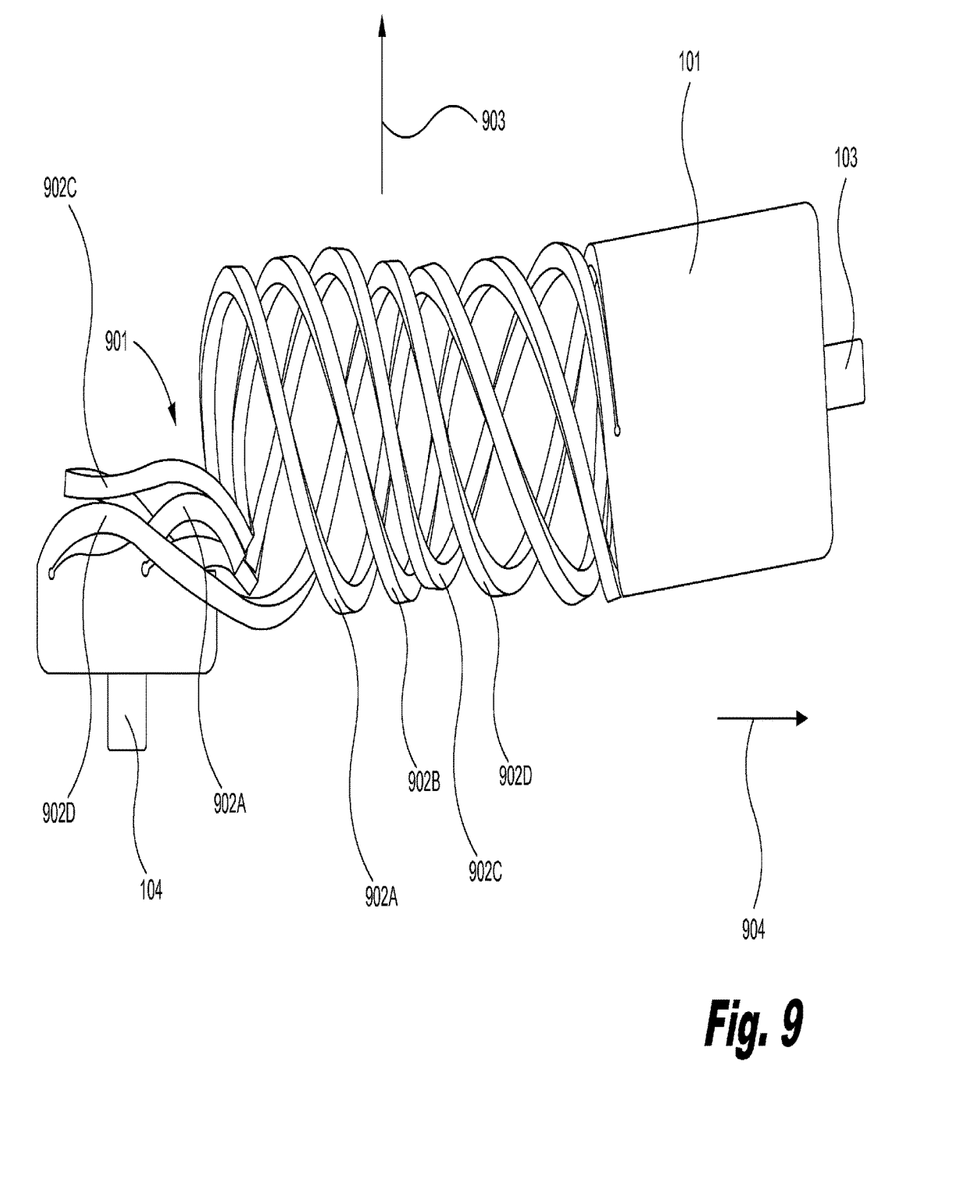
FIG. 9 is a side view of the cylinder of the tip-over post system in a deployed state, according to one example of the principles described herein.

FIG. 9 is a perspective view of the annular cylinder (101) of the tip-over post system (100) in a deployed state, according to one example of the principles described herein. In orienting the annular cylinder (101) of the tip-over post system (100) as depicted in FIG. 9, arrow (903) indicates the direction normal to the surface to which the tip-over post system (100) is coupled. Arrow (904) indicates the direction of force applied to the annular cylinder (101) of the tip-over post system (100). During deployment of the annular cylinder (101) and fall arrest in the event of a user falling from the structure to which the tip-over post system (100) is coupled, the annular cylinder (101) may deform in two phases. In the first phase, the annular cylinder (101) bends at a tip-over location (901) of the annular cylinder (101), the tip-over location (901) being defined as a section of the annular cylinder (101) at which the bending moment at that section is a maximum. The bending moment may be defined as a rotational force caused by a vector force occurring perpendicular to the moment origin.

As described above, the size and/or strength of the lands (201) between perforations may vary along the length of the helical cuts (202) defined in the annular cylinder (101). For example, the lands (201) located throughout the length of the helical cuts (202) may comprise relatively smaller and/or weaker lands (201) in the middle of the length of the helical cuts (202) relative to the lands (201) located toward the first (203) and second (204) ends of the helical cuts (202). In this example, the relatively weaker lands (201) may cause the annular cylinder (101) of the tip-over post system (100) to tip over at the point at which the relatively weaker lands (201) along the length of the helical cuts (202).

In another example, the size and/or strength of the lands (201) between perforations may vary along the length of the helical cuts (202) defined in the annular cylinder (101) such that a gradient of size and/or strengths of the lands (201) is created along the length of the helical cuts (202). In this example, the gradient provides an increasing resistance to deformation within the helical cuts (202) as the tip-over post system (100) slows and arrests the momentum realized from the free fall of an individual tethered to the tip-over post system (100). Thus, the annular cylinder (101) may be engineered to create a tip-over location (901) within the annular cylinder based on the size and/or strengths of the lands (201). In one example, the lands (201) throughout the helical cuts (202) may be engineered to create the tip-over location (901) by forming a land (201) or group of lands (201) that are relatively smaller and/or weaker than the remaining lands (201).

The second of the two phases of deployment of the tip-over post system (100) comprises an unzipping of the lands (201) of the helical cuts (202) and forming corresponding helical ribbons (902A, 902B, 902C, 902D). In addition to the lands (201) being engineered to create the tip-over location (901) within the annular cylinder (101), the remaining lands (102) may be relatively larger and/or stronger or smaller and/or weaker such that once a fall event occurs, the tip-over post system (100) may apply a constant opposing force, an increasing opposing force, or a decreasing opposing force relative to the gravitational force resulting from the mass of the falling individual being subjected to gravitational forces. In this manner, the remaining lands (102) serve to ensure that the individual whose fall is being arrested does not experience a sudden stop or "jerk" that may injure the individual or damage the structure to which the tip-over post system (100) is coupled.

When in a free fall, the human body is subjected to the effects of gravity in which the individual falls at approximately a rate of 9.8 m/s$^2$ (32.2 ft/s$^2$) In order to arrest that individual's fall, and opposing force must be applied that not only stops the individual's fall before hitting the ground or lower level of the structure, but also slows the individuals fall in a safe manner. Thus, a rate of change of acceleration referred to as "jerk" (measured in m/s$^3$ (ft/s$^3$)) must also be taken into account when attempting to arrest the individual's fall and in reducing or eliminating serious bodily injury or death. Thus, the lands (201) of the helical cuts (202) are engineered to slow and arrest the fall of the individual by absorbing and redirecting the energy of the fall through deformation of the annular cylinder (101) in a manner such that the acceleration provided by this opposing force is below a predefined acceleration limit.

Once deployed, the tip-over post system (100) must be replaced with a new unit. In one example, replacement of the unit may include replacement of the entire tip-over post system (100). In another example, replacement of the unit may include replacement of the annular cylinder (101) by decoupling the second bolt (104) from the base plate (108) and replacing those elements that are attached to the second bolt (104) after decoupling.

Figure 10:
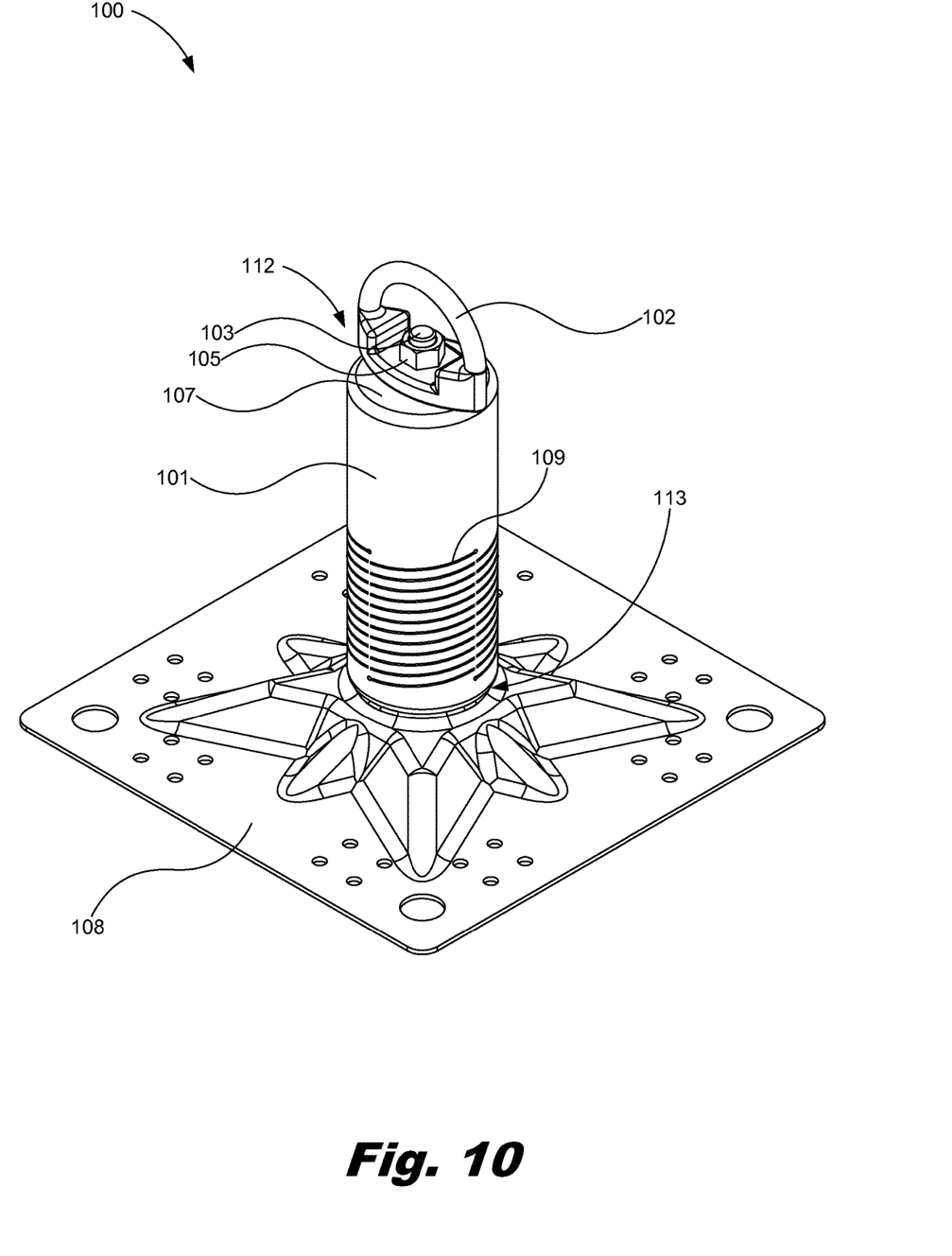
FIG. 10 is a perspective view of the tip-over post system of FIG. 1, according to another example of the principles described herein.

FIG. 10 is a perspective view of the tip-over post system (100) of FIG. 1, according to another example of the principles described herein. As described above, the tip-over post system (100) comprises an annular cylinder (101), and a base plate (108) coupled to the second end (113) of the annular cylinder (101). The tip-over post system (100) may also comprise a coupling element to which a user may couple a harness, rope, carabineer, or other user-side anchoring device. In one example, the coupling element is an anchor loop (102) coupled to the first end (112) of the annular cylinder (101), The anchor loop (102) is coupled to the first end (112) of the annular cylinder (101) via the top cap (107), the first bolt (103) screwed into the first threaded bolt head (FIG. 2, 210) of the top cap (107), and the first nut (105) secured to the first bolt (103). As depicted in FIG. 10, the anchor loop (102) is secured between the top cap (107) and the nut (105). In one example, the top cap (107) is welded to the annular cylinder (101), and the first bolt (103) is threaded into the first threaded bolt head (FIG. 2, 210) coupled to or defined within the top cap (107). In still another example, the top cap (107) is milled or forged as a complete unit with the top cap (107) of the annular cylinder (101), eliminating the need for the first bolt (103) and nut (105). It is the anchor loop (102) to which a user attaches a harness, rope, carabineer, or other user-side anchoring device in order to prevent falls or arrest a fall in the event of a fall incident. In one example, a bypass bracket may replace the anchor loop (102) depicted in FIG. 10.

In one example, the tip-over post system (100) described herein may be manufactured to comply with any number of governmental or private regulations, codes, or guidelines. For example, the tip-over post system (100) described herein may be manufactured to comply with OSHA regulations such as Title 29 of the Code of Federal Regulations, guidance and testing parameters for fall protection and fall arrest devices provided by the ANSI Z-359 Fall Protection Code, other types of parameters, or combinations thereof.

The specification and figures describe a tip over post includes a stanchion. The stanchion includes an annular cylinder. The annular cylinder includes a number of cuts defined along the longitudinal axis of the cylinder. A stanchion includes an annular cylinder. The annular cylinder includes a number of helical cuts defined along the longitudinal axis of the cylinder. The helical cuts comprise a number of perforations located along the helical cuts. The load the stanchion is to bear is based at least in part on the number of perforations located along the helical cuts. The specification and figures also describe a method of arresting a fall includes installing a tip over post, and arresting a fall using the moment and linear expansion of the annular cylinder. The tip over post includes an annular cylinder including a number of helical cuts defined along the longitudinal axis of the cylinder. The helical cuts comprise a number of perforations located along the helical cuts, This tip-over post system may have a number of advantages, including; (1) the ability to arrest the fall of an individual and eliminating or reducing serious bodily injury or death; (2) the ability to produce a fall arrest device that conforms with or exceeds regulatory standards; (3) the ability to manufacture a fall arrest device at a relatively reduced cost compared to previous devices and system; (4) the reduction of force applied to a structure to which the tip-over post system is coupled resulting in reduction or elimination of damage to the structure the tip-over post system is coupled to; (5) increasing the number of types of structures and materials the tip-over post system may be coupled to; (6) reducing or eliminating the need for reinforcing or bracing the structure to which the tip-over post system is coupled; (7) providing modification of the parameters of the cuts to fit requirements of the application of the tip-over post system pursuant to rules, codes, regulations, or laws; and (8) providing modification of the parameters of the height of the tip-over post system to accommodate roofing specification height requirements, among many other advantages.

The preceding description has been presented to illustrate and describe examples of the principles described. This description is not intended to be exhaustive or to limit these principles to any precise form disclosed. Many modifications and variations are possible in light of the above teaching.

What is claimed is:

1. A tip over post for arresting a fall, comprising:
   a stanchion comprising:
      an annular cylinder, the annular cylinder comprising a number of helical cuts defined along the longitudinal axis of the cylinder;
   an anchor loop coupled to the stanchion;
   a top cap; and
   a first bolt threaded into the top cap via a top cap bolt head defined within the top cap, the first bolt coupling the anchor loop to the stanchion.

2. The tip over post of claim 1, further comprising:
   a base plate;
   a bottom cap; and
   a second bolt threaded into the bottom cap via a bottom cap bolt head defined within the bottom cap, the second bolt coupling the stanchion to the base plate.

3. The tip over post of claim 1, in which the number of helical cuts form a quadruple helix, each of the four helixes of the quadruple helix cuts originating at 90 degree angles relative to the radius of the annular cylinder.

4. The tip over post of claim 1, in which the helical cuts are defined along the longitudinal axis of the annular cylinder for a number of revolutions.

5. The tip over post of claim 1, in which cuts defined along the longitudinal axis of the annular cylinder form a number of holes through the cylinder.

6. The tip over post of claim 1, in which cuts defined along the longitudinal axis of the annular cylinder are scorings.

7. The tip over post of claim 1, in which cuts defined along the longitudinal axis of the annular cylinder comprise a number of perforations.

8. The tip over post of claim 7, in which the strength of the perforations vary along the length of the annular cylinder.

9. The tip over post of claim 8, in which the variance of the strength of the perforations is a gradient along the length of the cylinder.

10. The tip over post of claim 9, in which the gradient comprises weaker perforations in a middle portion of the perforations relative to the perforations located toward the end portions of the perforations.

11. The tip over post of claim 7, in which the perforations are located in four strips along the length of the annular cylinder, each of the four strips of perforations being located at 90 degree angles relative to the radius of the annular cylinder.

12. The tip over post of claim 7, in which a load the stanchion is to bear is based at least in part on the number of perforations located along the helical cuts.

13. A stanchion for arresting a fall, comprising:
an annular cylinder, the annular cylinder comprising:
a number of helical cuts defined along the longitudinal axis of the cylinder, in which the helical cuts comprise a number of perforations located along the helical cuts,
an anchor loop coupled to the stanchion;
a top cap; and
a first bolt threaded into the top cap via a top cap bolt head defined within the top cap, the first bolt coupling the anchor loop to the stanchion,
in which a load the stanchion is to bear is based at least in part on the number of perforations located along the helical cuts.

14. The stanchion of claim 13, in which the strength of the perforations vary along the length of the annular cylinder.

15. The stanchion of claim 14, in which the variance of the strength of the perforations is a gradient along the length of the cylinder.

16. The stanchion of claim 15, in which the gradient comprises weaker perforations in a middle portion of the perforations relative to the perforations located toward the end portions of the perforations.

17. A method of arresting a fall comprising:
installing a tip over post, the tip over post comprising:
an annular cylinder, the annular cylinder comprising:
a number of helical cuts defined along the longitudinal axis of the cylinder,
a number of perforations located along the helical cuts;
an anchor loop coupled to the stanchion;
a top cap; and
a first bolt threaded into the top cap via a top cap bolt head defined within the top cap, the first bolt coupling the anchor loop to the stanchion, arresting a fall using the moment and linear expansion of the annular cylinder.

18. The method of claim 17, in which the strength of the perforations vary along the length of the annular cylinder.

* * * * *